United States Patent
Tokumoto

(10) Patent No.: US 6,763,733 B2
(45) Date of Patent: Jul. 20, 2004

(54) ROTATIONAL ANGLE DETECTING DEVICE, TORQUE DETECTING DEVICE, AND STEERING APPARATUS

(75) Inventor: Yoshitomo Tokumoto, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/231,150

(22) Filed: Aug. 30, 2002

(65) Prior Publication Data

US 2003/0062890 A1 Apr. 3, 2003

(30) Foreign Application Priority Data

Oct. 2, 2001 (JP) ........................................ 2001-306732

(51) Int. Cl.⁷ ................................................. G01L 3/10
(52) U.S. Cl. ...................... 73/862.333; 73/862.334; 73/862.335; 336/20; 336/30; 336/115
(58) Field of Search .......................... 73/862, 862.333, 73/862.334, 862.335, 862.69, 779, 862.328, 862.329; 336/20, 30, 115; 324/209

(56) References Cited

U.S. PATENT DOCUMENTS

| 4,725,776 A | * | 2/1988 | Onodera et al. | 324/207.21 |
| 4,933,580 A | * | 6/1990 | Ishino et al. | 310/26 |
| 4,996,890 A | * | 3/1991 | Taniguchi et al. | 73/862.331 |
| 5,442,966 A | * | 8/1995 | Hase et al. | 73/862.335 |
| 5,796,014 A | * | 8/1998 | Chikaraishi et al. | 73/862.331 |
| 6,246,232 B1 | * | 6/2001 | Okumura | 324/207.2 |
| 6,363,797 B1 | * | 4/2002 | Tokumoto | 73/862.328 |
| 6,513,396 B2 | * | 2/2003 | Nakamura et al. | 73/862.335 |
| 6,543,571 B2 | * | 4/2003 | Tokumoto | 180/446 |

FOREIGN PATENT DOCUMENTS

| DE | 10041095 A1 | 6/2001 |
| EP | 1087218 A1 | 3/2001 |
| JP | 2002-107112 A | 4/2002 |

OTHER PUBLICATIONS

E. G. Chowanietz: "Automobile electronics in the 1990s Part 2: Chassis electronics", 8054 Electronics & Communication Engineering Journal, Institution of Electrical Engineers, London, GB, vol. 7, No. 2, Apr. 1, 1995, pp. 53–58, XP00501113, ISSN: 0954–0695.

* cited by examiner

Primary Examiner—Edward Lefkowitz
Assistant Examiner—Alandra Ellington
(74) Attorney, Agent, or Firm—Birch, Stewart, Kolasch & Birch, LLP

(57) ABSTRACT

A target plate 3 is provided onto a shaft 1 and is has targets 3a arranged on an outer circumference. Facing the outer circumference of this target plate 3 is a sensor 5 that is provided with MR elements, which are arranged in a circumferential direction in accordance with an arrangement interval of the targets 3a. A rotational angle of the target plate 3 is calculated based on an output obtained between the MR elements in accordance with the displacement in the circumferential direction of the targets 3a, 3a with the rotation of the target plate 3.

20 Claims, 9 Drawing Sheets

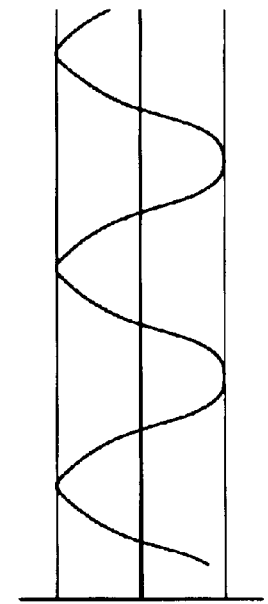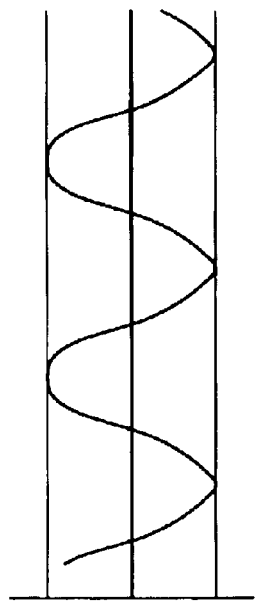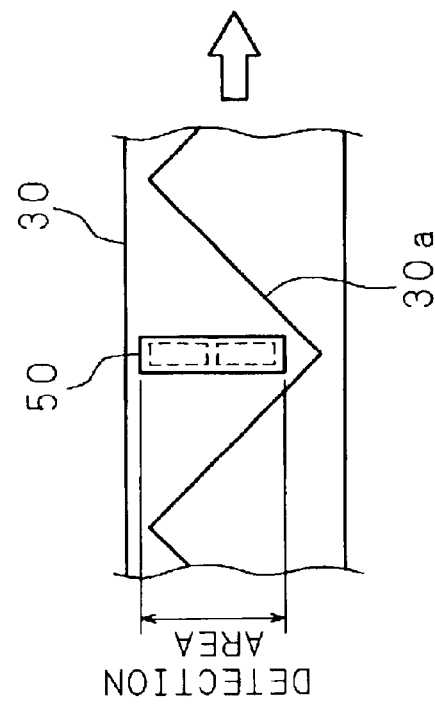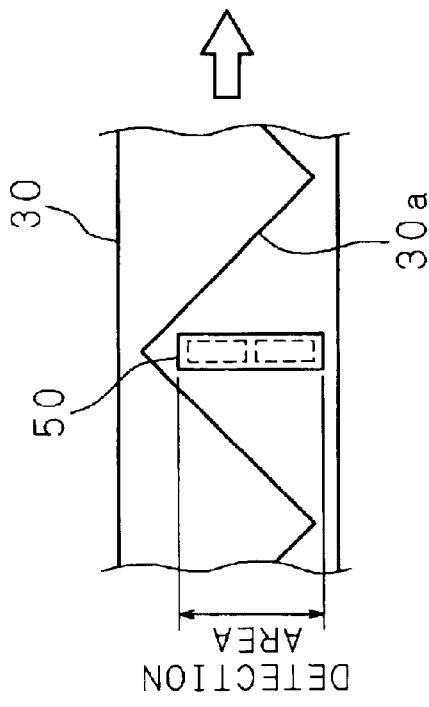
FIG. 3A
FIG. 3B

ROTATIONAL ANGLE DETECTING DEVICE, TORQUE DETECTING DEVICE, AND STEERING APPARATUS

BACKGROUND OF THE INVENTION

1. Field of the Invention

The present invention relates to a rotational angle detecting device for detecting a rotational angle of a rotating member, a torque detecting device for detecting a rotational torque applied to a rotating shaft, and an automobile steering apparatus provided with the rotational angle detecting device and the torque detecting device.

2. Description of Related Art

An electric power steering apparatus which is constructed to drive an electric motor for assisting steering on the basis of a detection result of a steering torque applied to a steering wheel for steering to transmit a rotating force of the electric motor to a steering mechanism for assisting steering has an advantage in that the assisting power characteristics can be easily controlled in accordance with the running state such as high and low speed of the automobile, the frequency of steering, and the like as compared with a hydraulic pressure power steering apparatus using a hydraulic pressure actuator as a generation source of a steering assisting power. As a consequence, the scope of application of an electric power steering apparatus has tended to expand in recent years.

In such an electric power steering apparatus, a steering torque is detected at an intermediate portion of a steering shaft for connecting the steering wheel and a steering mechanism by detecting the rotational angle at two positions separated in the shaft length direction. That is, on the steering shaft which is operated for steering, torsion is generated with an action of the steering torque which is applied to the steering wheel. This torsion corresponds to a difference in the detection angle at two positions described above, so that the rotational torque (steering torque) applied to the steering shaft can be determined by using this difference.

Furthermore, in actuality, the steering shaft is constructed in such a manner that a first shaft (an input shaft) on the steering wheel side and a second shaft (an output shaft) on the steering apparatus side are separated, and these two shafts are coaxially connected via a torsion bar having a small diameter as a torsion element, so that a large relative angle deviation is generated with the torsion of a torsion bar between the first shaft and the second shaft at the time of action of the above steering torque. Consequently, the torque is detected with a high degree of accuracy on the basis of a difference in the detection angle.

Furthermore, in the electric power steering apparatus, it is necessary to detect the rotational angle of the steering shaft, namely the steering angle from the mid-point of the steering angle in order to use the drive control of the electric motor for assisting the steering. In the torque detecting device described above, the steering angle can be detected by the rotational angle detected at two positions of the steering shaft.

The applicant of the present invention proposed in Japanese Patent Application Laid-Open No. 2002-107112 a detecting device which can be preferably used in the detection of the rotational angle and the rotational torque as described above. In the schematic view of FIG. 1, a construction of the rotational angle and torque detecting device is shown.

These conventional rotational angle and torque detecting device, as shown in FIG. 1, is provided with target plates (rotating members) 30 and 40 both having a disc-like shape which are externally fitted onto and fixed to both the first shaft 1 and the second shaft 2 in the vicinity of a connection portion of the first shaft 1 and the second shaft 2 coaxially connected via a torsion bar T. MR (magnetic resistance effect) sensors 50 and 60 as detecting means are fixed and arranged so as to be positioned opposite to the outer circumferencial surface of these target plates 30 and 40.

On the outer circumferential surface of the target plates 30 and 40 where MR sensors 50 and 60 are positioned opposite to each other, targets 30a and 40a are provided as detection targets. These targets 30a and 40a are, as shown in FIG. 1, protrusions made of a magnetic member constructed as a partially helical continuous member whose inclination direction with respect to an axial direction is cyclically changed, and is present as a magnetically discontinuous portion with respect to the peripheral portion. Such targets 30a and 40a reciprocate in an axial direction in accordance with the rotation of the target plates 30 and 40 when viewing the fixed position of the MR sensors 50 and 60 as a reference. Then, the MR sensors 50 and 60 are constructed so as to generate a sine wave-like output which changes cyclically in accordance with the axial direction deviation of the targets 30a and 40a.

FIG. 2 is a view for explaining an operation of detecting rotational angle with the conventional rotational angle and torque detecting device described above. As shown in FIG. 2, the MR sensor 50 is constructed in such a manner that a pair of MR (magnetic resistance effect) elements 50a and 50b having a characteristic of changing the electric resistance with the action of the magnetic field are connected in series, and an internal magnet 50c is arranged so as to allow an equally magnetic field to act on one side of the pair of MR elements 50a and 50b. With such a construction, an electric potential, when a predetermined voltage is applied to a series circuit of the MR elements 50a and 50b, can be taken out as an output.

FIG. 2 is a view showing a state in which the target 30a provided on an outer circumference of the target plate 30 is developed on a plane. The MR sensor 50 which is constructed in a manner as described above is arranged, so that the other side (the opposite side of internal magnet 50c) of MR elements 50a and 50b is positioned approximately at the center of the deviation area of the above-described target 30a. When the target plate 30 is rotated in this state, the MR sensor 50 relatively changes its position in a circumferential direction along the outer circumference of the target plate 30 and the target 30a on the outer circumference of the target plate 30 is deviated in the direction of a parallel arrangement of MR elements 50a and 50b.

Here, since the target 30a is made of a magnetic member, the magnetic field formed by the internal magnet 50c is deviated to either one of the MR elements 50a and 50b in accordance with a deviation of the target 30a. That is, in the case where the MR sensor 50 is positioned at point A in FIG. 2, the magnetic field formed by the internal magnet 50c is deviated to the MR element 50a side which relatively comes close to the target 30a, so that the resistance of the MR element 50a becomes larger while the resistance of the other MR element 50b becomes small. Consequently, the output taken out between both MR elements 50a and 50b becomes minimum. On the other hand, in the case where the MR sensor 50 is positioned at point B in FIG. 2, the magnetic field formed by the internal magnet 50c is deviated to the MR element 50b side which comes relatively close to the target 30a so that the resistance of the MR element 50b increases while the resistance of the other MR element 50a decreases, so that the output taken between both MR elements 50a and 50b becomes maximum.

In this manner, the output of the MR sensor 50 becomes an output having a sine wave-like form which cyclically changes between the minimum output at the point A and the maximum output at the point B in accordance with the target 30a caused by the rotation of the target plate 30. Consequently, this output is taken in at a predetermined sampling cycle to calculate an accumulated value of output change from the previous sampling time, so that the rotational angle of the target plate 30 and the first shaft 1 are obtained.

Also, at the MR sensor 60 arranged opposite to the target plate 40 on the second shaft 2 side, completely the same output can be obtained in response to the target 40a on the outer circumference of the target plate 40. On the basis of the output change, the rotational angle of the target plate 40 and the second shaft 2 can be obtained. Furthermore, with a difference of the rotational angle between the first shaft 1 and the second shaft 2 which are obtained in such manner, a rotational torque applied to both shafts 1 and 2 can be determined.

However, in the conventional rotational angle and torque detecting device which are configured in the described manner, there is a problem in that when the MR sensors 50 and 60 which are fixedly arranged and the target plates 30 and 40 which rotate integrally with the first shaft 1 and the second shaft 2 are assembled at a deviated position in an axial direction, such a positional deviation affects the output of the MR sensors 50 and 60, so that the rotational angle and the torque accuracy which are obtained with this output change are lowered.

FIG. 3A and FIG. 3B are views for explaining problems in the rotational angle and torque detecting device as described above. FIG. 3A is a view showing a state in which the MR sensor 50 is deviated in position upwardly with respect to the target plate 30. FIG. 3B is a view showing a state in which the MR sensor 50 is deviated in position downwardly in the same manner. Respectively, FIG. 3A and FIG. 3B, the output waveforms obtained in the respective cases are shown together as well.

In the state shown in FIG. 3A, since the detection area of the MR sensor 50 is deviated upwardly in the formation area of the target 30a provided on the target plate 30, the detection area of the MR sensor 50 comes to exclude an inclination changing portion on the lower side of the target 30a. As a consequence, the output waveform of the MR sensor 50 is different from those on upper and lower half portions. As shown in FIG. 3A, the lower half portion of the output corresponding to the upper half portion of the target 30a becomes a waveform having a gentle peak value whereas the upper half portion of the output corresponding to the lower half portion of the target 30a becomes a waveform having a sharp peak value.

On the other hand, in the state shown in FIG. 3B, since the detection area of the MR sensor 50 is deviated downwardly in the formation area of the target 30a, the detection area of the MR sensor 50 comes to exclude the inclination changing portion on the upper side of the target 30a. As a consequence, the output waveform of the MR sensor 50 comes to have an upper half portion with a gentle peak value and a lower half portion with a sharp peak value.

In a case where the output of such the MR sensor 50 is obtained, an error is generated in the rotational angle of the target plate 30 and the first shaft 1 obtained by accumulating a variation quantity of the output of the MR sensor 50. Completely in the same manner, an error is also generated in the rotational angle of the target plate 40 and the second shaft 2 obtained on the basis of the MR Sensor 60. Furthermore, an accuracy of the rotational torque obtained from the rotational angle difference between the first shaft 1 and the second shaft 2 is also lowered as well.

Furthermore, in a case where the target plates 30 and 40 are attached inclined with respect to the first shaft 1 and the second shaft 2, or in a case where the first shaft 1 and the second shaft 2 to which the target plates 30 and 40 are attached are twisted and turned, directions of the rotational deviation of the MR sensors 50 and 60 change according to the rotation of respective targets 30 and 40. Consequently, the output waveform shown in FIG. 3A and FIG. 3B exist simultaneously in the output obtained in one rotation of the target plates 30 and 40, so that the detection accuracy of the rotational angle and the rotational torque is further lowered.

Therefore, conventionally, in order to discard error factors of the output of the MR sensors 50 and 60 resulting from the positional deviation in the axial direction of the target plates 30 and 40 described above, it is required to assemble MR sensors 50 and 60 and the target plates 30 and 40 with a high accuracy. Furthermore, generation of twist and turn is prevented by increasing the support rigidity of the target plates 30 and 40. Thus, there is a problem in that a large amount of labor and time is required for countermeasures with the above problem.

BRIEF SUMMARY OF THE INVENTION

The present invention has been made in view of the above circumstances. An object of the invention is to provide a rotational angle detecting device and a torque detecting device which enable detection with a high accuracy by effectively preventing the generation of a detection error of the rotational angle and the rotational torque resulting from a positional deviation in the axial direction of the rotating member and the detecting means without requiring labor and time at the time of assembling. Furthermore, an object of the invention is to provide a steering apparatus using these devices for automobiles.

A rotational angle detecting device according to a first aspect of the present invention comprising: a rotating member; a target provided on a rotational circumference of the rotating member; and detecting means for cyclically changing an output in accordance with a deviation of the target with the rotation of the rotating member; whereby a rotational angle of the rotating member is detected on the basis of the output change of the detecting means; characterized in that the target is a magnetically discontinuous portion which is parallelly provided in a circumferential direction of the rotating member; and the detecting means is constructed in such a manner that a pair of detection elements, which sense magnetism, are arranged in a circumferential direction in accordance with the arrangement cycle of the target to enable obtaining an output between both the detection elements.

In this first aspect of the present invention, magnetically discontinuous portions are parallelly provided in a circumferential direction on a rotational circumference of the rotating member to form targets and a deviation of the targets in the circumferential direction with the rotation of the rotating member being taken out as an output between a pair of detection elements which sense magnetism and arranged in a circumferential direction so as to correspond to a parallel arrangement interval of the targets, and a rotational angle is detected on the basis of a change in this output.

Furthermore, the rotational angle detecting device according to a second aspect of the present invention is characterized in that the pair of detection elements of the first aspect are magnetic resistance effect elements which change electric resistances with action of the magnetic field.

In this second aspect of the present invention, an MR element (magnetic resistance effect element) which changes electric resistance by action of the magnetic field is used as a detection element and the fact that an electric resistance of a pair of MR elements arranged in a circumferential direction of the rotating member is changed in accordance with a deviation of the targets with rotation of the rotating member so as to easily obtain the rotational angle of the rotating member on the basis of a change in the output voltage of a bridge circuit including both MR elements.

Furthermore, the rotational angle detecting device according to a third aspect of the present invention is characterized in that the rotating member of the first or second aspect is a gear provided with a plurality of teeth made of a magnetic member equally arranged on the outer circumferential surface as the target. Furthermore, the rotational angle detecting device according to a fourth aspect of the present invention is characterized in that the rotating member of the first or second aspect is a ring made of a magnetic member being provided with a plurality of slits equally arranged on the outer circumferential surface as the target. Furthermore, the rotational angle detecting device according to a fifth aspect of the present invention is characterized in that the rotating member of the first or second aspect is a disk being provided with magnetic poles having different polarities which are equally and alternately arranged on the outer circumferential surface as the target.

In the third through the fifth aspects of the present invention, a rotating member which is formed by a parallelly provided targets in a circumferential direction as a magnetically discontinuous portion is simply composed of a gear provided with teeth made of a magnetic member, a ring made of a magnetic member having a slit formed on a circumferential surface thereof, and a disk which is alternately magnetized to both N and S poles.

Furthermore, the torque detecting device according to a sixth aspect of the present invention is a torque detecting device for detecting a rotational torque applied to a first shaft and a second shaft coaxially connected via a torsion element by a relative angle deviation between the first shaft and the second shaft caused by the torsion of the torsion element, wherein: the rotational angle detecting device any one of the first through fifth aspects attached respectively on the first shaft and the second shaft; and torque calculating means for calculating the rotational torque on the basis of the rotational angle difference detected respectively by the rotational angle detecting devices.

In this sixth aspect of the present invention, a rotational angle detecting device is arranged which enables detecting an accurate angle without being affected by the axial direction position of the detecting means respectively on the first and the second shaft connected via the torsion elements, so that a rotational torque is detected with a high accuracy which is applied to the first and the second shaft based on the difference in the rotational angle detected by these rotational angle detecting devices.

Furthermore, a steering apparatus according to a seventh aspect of the present invention is characterized by comprising: the rotational angle detecting devices any one of the first through fifth aspects and/or the torque detecting device of the sixth aspect at the middle of the steering shaft for connecting the steering wheel and the steering mechanism.

In this seventh aspect of the present invention, the rotational angle detecting device and the torque detecting device as described above applied to the steering apparatus of automobiles to obtain an accurate detection value of the steering angle and the steering torque, so that the result is used for various types of control required for a high reliability such as a drive control or the like of an electric motor for steering assistance in the electric power steering apparatus.

The above and further object and features of the invention will more fully be apparent from the following detailed description with accompanying drawings.

BRIEF DESCRIPTION OF THE SEVERAL VIEWS OF THE DRAWINGS

FIG. 3A and FIG. 3B are views for explaining problems in the conventional rotational angle detecting device and the torque detecting device;

DETAILED DESCRIPTION OF THE PREFERRED EMBODIMENTS

Figure 1:
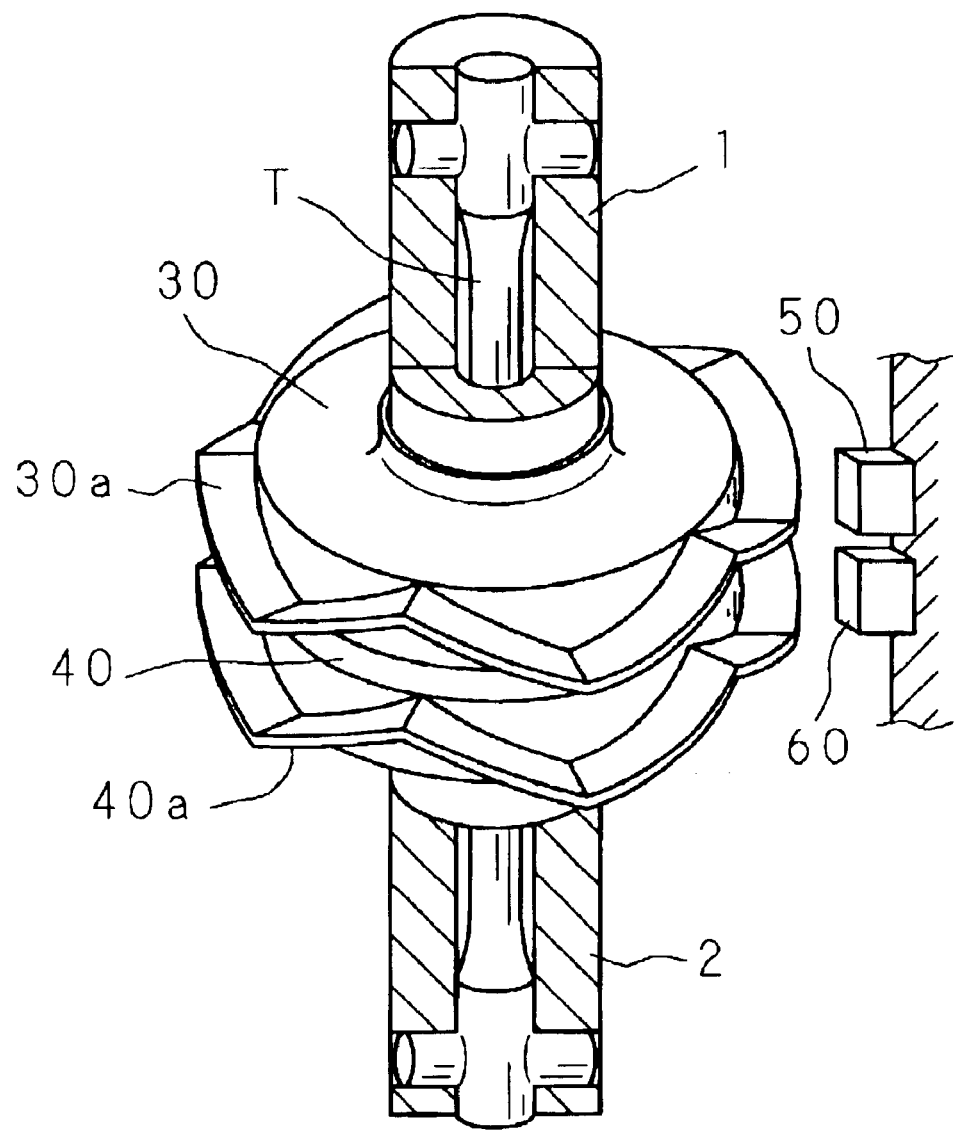
FIG. 1 is a schematic view showing a construction of a conventional rotational angle and torque detecting device.
Figure 2:
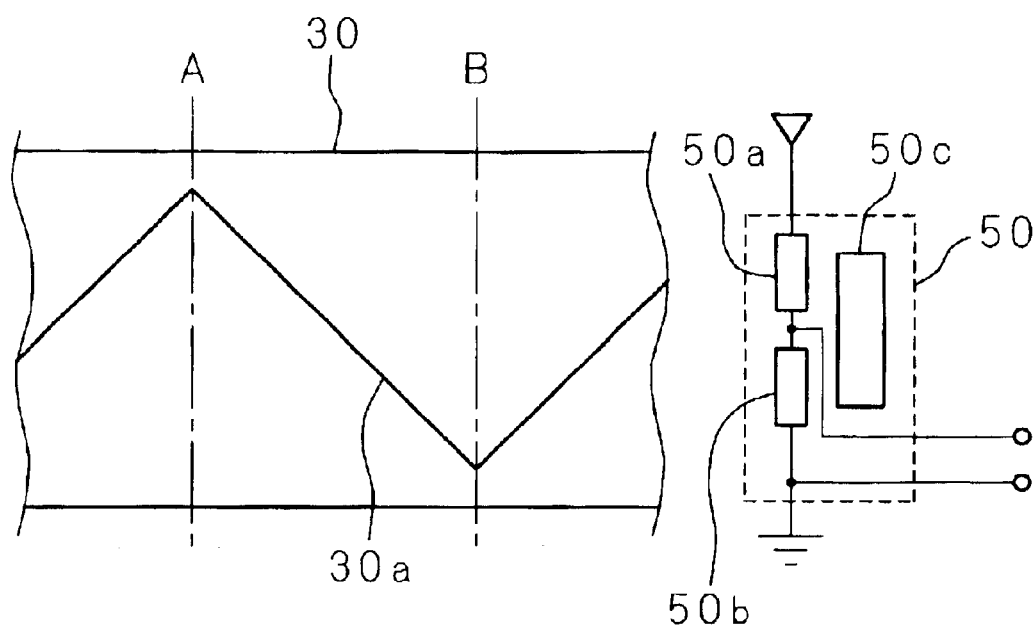
FIG. 2 is a view for explaining an operation for detecting a rotational angle with the conventional rotational angle and torque detecting device.

Hereinafter, the present invention will be explained in detail by referring to the drawings showing preferred embodiments of the invention.

First Embodiment

Figure 4:
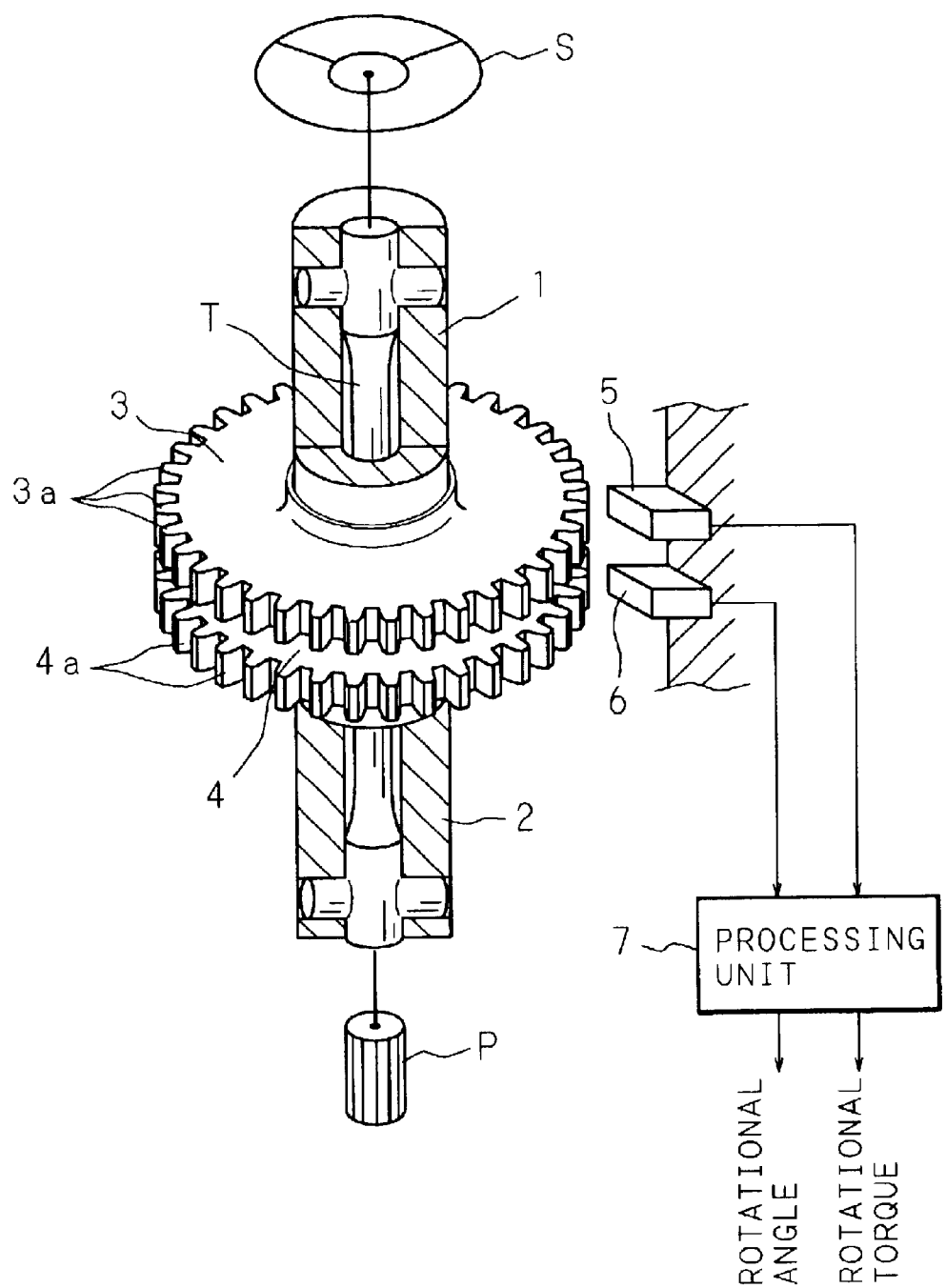
FIG. 4 is a schematic view showing a construction of a rotational angle and torque detecting device according to the present invention which is applied to a steering apparatus of automobiles.

FIG. 4 is a schematic view showing a construction of a rotational angle and torque detecting device according to the present invention for which the device is applied to a steering apparatus of automobiles.

As shown in FIG. 4, a steering shaft which connects the steering wheel S and a steering mechanism is constructed by coaxially connecting via a torsion bar T having a small diameter, a first shaft (input shaft) 1 having an upper end portion of which is connected to a steering wheel S for steering operation and a second shaft 2 (output shaft) having a lower end portion of which is connected to a pinion P forming a part of the steering mechanism. The rotational angle and torque detecting device according to the present invention comprises a target plates (rotating members) 3 and 4 each which has a disk-like shape and are fit onto and fixed to a portion in the vicinity of the connection portion of the first shaft 1 and the second shaft 2, and which are rotated integrally respectively with the first shaft 1 and the second shaft 2, and MR sensors (detecting means) 5 and 6 which are arranged and fixed so as to be positioned opposite to each of the outer circumferencial surfaces of the target plates 3 and 4, respectively.

The target plate 3 of the first shaft 1 side is a gear made of a magnetic member having a number of teeth arranged at even intervals on its outer circumferential surface, and respective teeth comprise targets $3a, 3a$ . . . as a magnetically discontinuous portion in the circumferential direction. The target plate 4 of the second shaft 2 side is also gear being provided with the same targets $4a, 4a$ . . . Both target plates 3 and 4 are positioned in such a manner that respective targets $3a$ and $4a$ are correctly aligned in a circumferential direction. Furthermore, both target plates 3 and 4 may be such that only respective teeth forming portions may be made of a magnetic member.

Such targets $3a, 3a$ . . . are deviated in a circumferential direction in accordance with the rotation of the target plate 3 which is generated together with the first shaft 1, and passes discontinuously through the arrangement position of the MR sensor 5 positioned opposite to the outer circumference of the target plate 3. The MR sensor 5 is constructed in the manner as described below so as to generate an output with a sine wave-like form which cyclically changes in response to the passage of the targets $3a, 3a$ . . .

FIG. 5A, FIG. 5B, FIG. 5C and FIG. 5D are views for explaining an operation of detecting a rotational angle with the rotational angle and torque detecting device according to the present invention. As shown in FIG. 5A through FIG. 5D, the MR sensor 5 is a bridge circuit in which a pair of MR (magnetic resistance effect) elements $5a$ and $5b$ having the characteristics of changing the electric resistance with action of the magnetic field are connected in series, and internal magnet $5c$ for bias is arranged on one side of the elements to allow an equal magnetic field to act on both sides of the elements. Then, these are constructed in such a manner that a potential between both MR elements $5a$ and $5b$ at the time of application of a predetermined voltage to the series circuit of the MR elements $5a$ and $5b$ is taken out as an output.

Figures 5A, 5B, 5C, 5D:
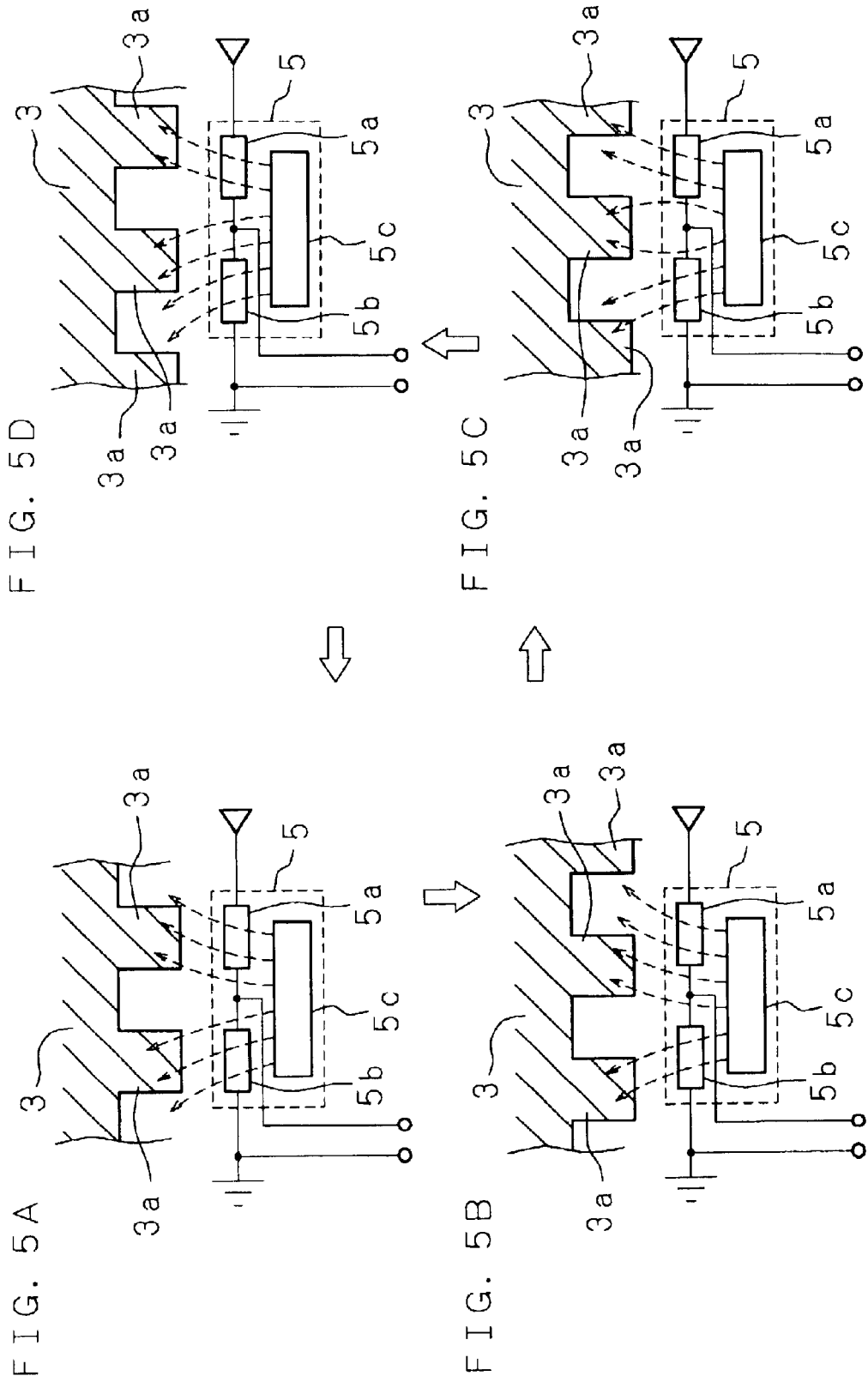
FIG. 5A through FIG. 5D are views for explaining an operation for detecting a rotational angle with the rotational angle and torque detecting device according to the present invention.

FIG. 5A through FIG. 5D are views showing the state in which the targets $3a, 3a$ . . . provided on the outer circumference of the target plate 3 are developed on a plane. In the MR sensors 5 which detect the target plate 3, the pair of MR elements $5a$ and $5b$ is arranged in a circumferential direction of the target plate 3 facing the opposite side of the internal magnet $5c$ toward the outer circumference of the target plate 3 on which the targets $3a, 3a,$ . . . are provided. Here, the parallel arrangement interval of the MR elements $5a$ and $5b$ is set so as to align with the parallel arrangement interval of the targets $3a$ and $3a$ on the circumference of the target plate 3. As shown in FIG. 5A, each of the MR elements $5a$ and $5b$ are arranged to be positioned opposite the targets $3a$ and $3a$ positioned adjacent to each other.

When the target plate 3 is rotated in one direction in this state, the targets $3a$ and $3a$ arranged on the outer circumference of the target plate 3 are deviated in the parallel arrangement direction of the pair of MR elements $5a$ and $5b$ of the MR sensor 5. As shown in FIG. 5B, FIG. 5C and FIG. 5D, the opposite state with the MR elements $5a$ and $5b$ and the internal magnet $5c$ between the MR elements $5a$ and $5b$ changes one after another. Here, since the targets $3a$ and $3a$ are made of a magnetic member, a magnetic field formed around the MR elements $5a$ and $5b$ by the internal magnet $5c$ changes as follows in accordance with the deviation of the targets $3a$ and $3a$ on the other side.

First, in the state as shown in FIG. 5A, the internal magnet $5c$ is positioned approximately in the center of the targets $3a$ and $3a$ positioned opposite to respective MR elements $5a$ and $5b$. In this state, the intensity of the magnetic field around both MR elements $5a$ and $5b$ is approximately the same. In a case where the targets $3a$ and $3a$ are deviated from this state, as shown in FIG. 5B, the target $3a$ of the MR element $5a$ side approaches, while the target $3a$ of the MR element $5b$ side is separated. As a consequence, the intensity of the magnetic field around the MR elements $5a$ and $5b$ becomes strong on the MR element $5a$ side while the magnetic field becomes weak on the MR element $5b$ side. As a consequence, an output of the MR sensor 5 taken out from a position between the MR elements $5a$ and $5b$ decreases with a transition from the state shown in FIG. 5A to the state shown in FIG. 5B.

In a case where the targets $3a$ and $3a$ are further deviated, as shown in FIG. 5C, there arises a state in which one target $3a$ is positioned approximately at the center of the MR elements $5a$ and $5b$. In this state, the internal magnet $5c$ positioned between the MR elements $5a$ and $5b$ becomes opposite to the target $3a$. In this state, as same as the case shown in FIG. 5A, the intensity of the magnetic field around both MR elements $5a$ and $5b$ becomes approximately the same. Consequently, the output of the MR sensor 5 increases with a transition from the state shown in FIG. 5B to the state shown in FIG. 5C.

In a case where the targets $3a$ and $3a$ are further deviated, as shown in FIG. 5D, the target $3a$ positioned opposite to the internal magnet $5c$ comes close to the MR element $5b$ side, so that the target $3a$ is separated from the MR element $5a$ side. The intensity of the magnetic field around the MR elements $5a$ and $5b$ becomes weak on the MR element $5a$ side and becomes strong on the MR element $5b$ side. Consequently, the output of the MR sensor 5 further increases with a transition from the state shown in FIG. 5C to the state shown in FIG. 5D.

In a case where the targets $3a$ and $3a$ are further deviated in position, a state thereof is returned as shown in FIG. 5A. At that time, intensity of the magnetic field around the MR elements $5a$ and $5b$ are approximately same. Therefore, the output of the MR sensor 5 decreases with a transition from a state shown in FIG. 5D to that shown in FIG. 5A.

Figure 6:
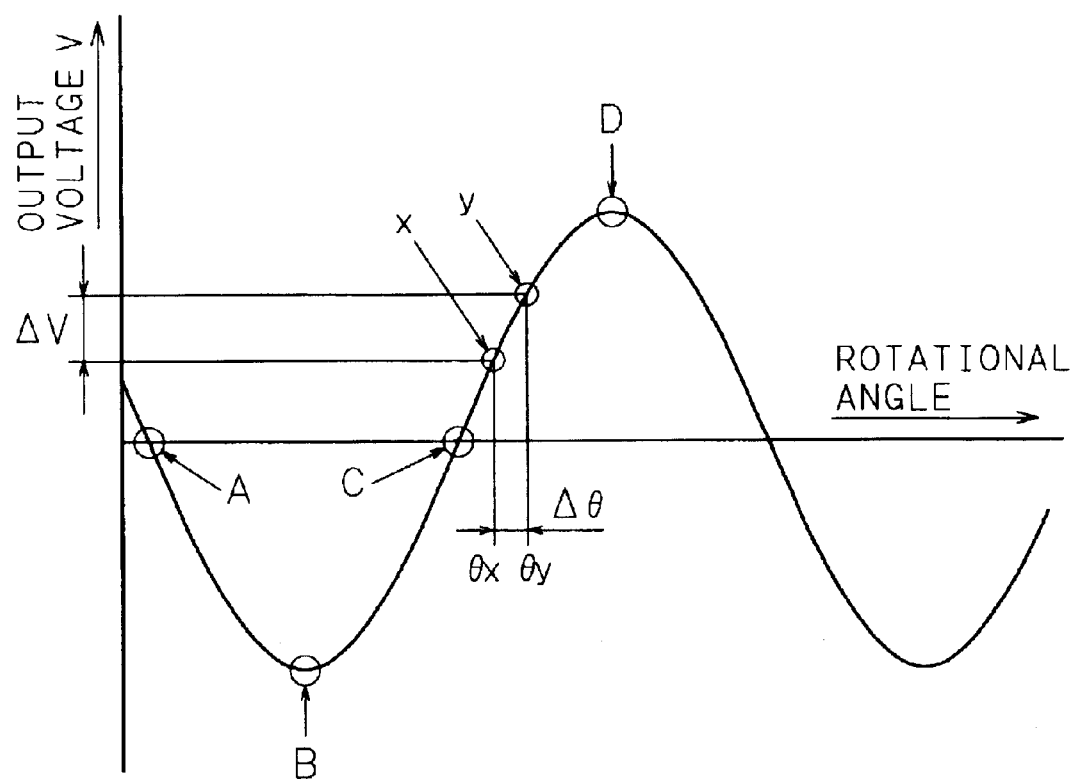
FIG. 6 is a view showing an output example by an MR sensor.

The MR sensor 5 positioned opposite to the target plate 3 in this manner generates an output which repeats a cyclic increase and decrease in accordance with the approach and separation of the targets $3a, 3a$ . . . provided on an outer circumference thereof, for example, an output having a sine wave-like form as shown in FIG. 6. Symbols A through D in FIG. 6 correspond to respective states shown in FIG. 5A through FIG. 5D.

The output of such the MR sensor 5 is given to a processing unit 7 formed by using a microprocessor. In the processing unit 7, a variation quantity of an output of the MR sensor 5 inputted by each of a predetermined sampling cycle is subsequently accumulated, so that the rotational angle of the target plate 3 and the first shaft 1 is calculated. For example, when sampling is executed at point y in FIG. 6, a variation quantity $\Delta V$ from the previous sampling time shown as point x can be obtained in the same manner. Furthermore, a variation quantity $\Delta \theta$ of this rotational angle corresponding to this variation quantity $\Delta V$ can be obtained. The rotational angle $\theta_y$ at point y can be calculated by adding the variation quantity Δθ to or subtracting the same from the previously calculated rotational angle $\theta_x$ at point x. By repeating the same processing, it becomes possible to calculate a continuous rotational angle.

Furthermore, it is desirable to calculate an accurate rotational angle over the entire circumference by arranging two MR sensors 5 described above on the outside of the target plate 3 to obtain outputs with different phases with the MR sensors 5, by appropriately changing over both outputs to be used, and by avoiding sampling in an inaccurate output area in the vicinity of a maximum value or a minimum value of an output having a sine wave-like form as shown in FIG. 6. Furthermore, in a case where two MR sensors 5 and 5 are arranged, it is desirable to fix two MR sensors 5 and 5 by integrally accommodating in a common housing and fixing to be faced to the outside of the target plate 3.

In the MR sensors 6 arranged opposite to the target plate 4 on the second shaft 2 side, completely the same output can be obtained in response to the targets 4a, 4a . . . on the outer circumference of the target plate 4 to be given to the processing unit 7. At the processing unit 7, a rotational angle of the target plate 4 and the second shaft 2 are calculated on the basis of this output change. Furthermore, with a difference in the rotational angle of the first shaft 1 and the second shaft 2 which are individually calculated, the rotational torque (steering torque) applied to both the shafts 1 and 2 is calculated.

In the rotational angle and torque detecting device which is constructed as described above, gears are used as a target plate 3, teeth parallelly provided on an outer circumference of the target plate 3 are taken out as targets 3a and 3a and deviation of the targets 3a and 3a in the circumferential direction with the rotation of the target plate 3 is taken out as an output between a pair of detection elements (MR elements 5a and 5b) arranged in the direction in which the targets 3a and 3a are parallelly provide. As a consequence, even in the state in which a positional deviation in an axial direction is generated between the MR sensor 5 fixed and arranged with MR elements 5a and 5b and the target plate 3 which becomes a detection target, the output of the MR sensor 5 is not affected so that a rotational angle of the first shaft 1 and the target plate 3 can be detected with a high degree of accuracy.

Figure 7:
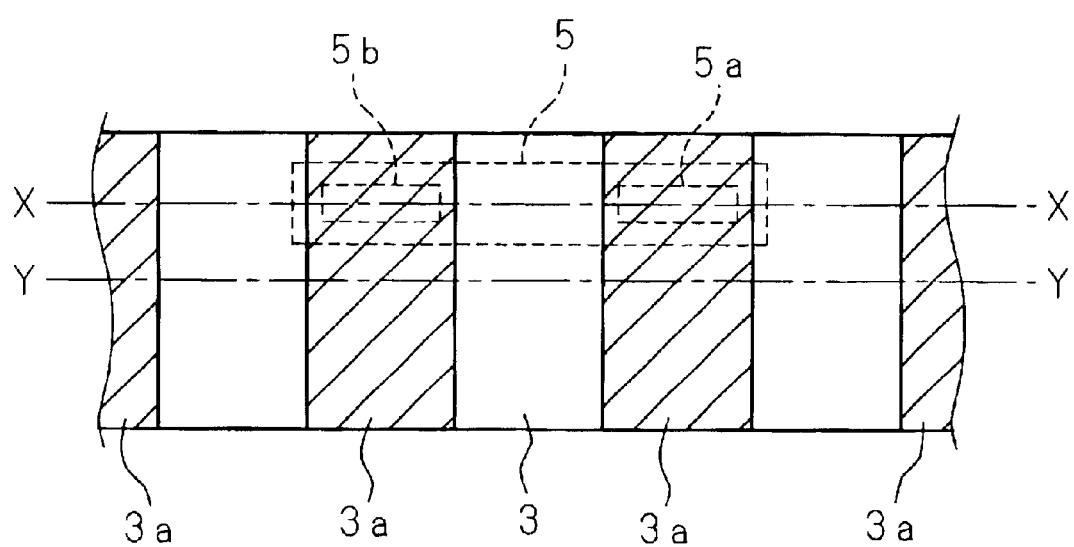
FIG. 7 is a view for explaining a detecting operation under a condition where the positional deviation in the axial direction generates.

FIG. 7 is a view for explaining a detection operation which is performed under the occurrence of a positional deviation in an axial direction. Shown is a state in which the MR sensor 5 is attached having a positional deviation upwardly with respect to the target plate 3. A detection area of such the MR sensor 5 is positioned at a position shown as line X—X in FIG. 7 and deviated upwardly from the normal detection area shown as line Y—Y in FIG. 7. However, the deviation of the targets 3a and 3a with the rotation of the target plate 3 is generated completely in the same manner as the normal line on line Y—Y. Consequently, the output of the MR sensor 5 whose detection area is the line X—X becomes the approximately the same as an output on the line Y—Y which is a normal detection area, so that an accurate rotational angle can be calculated without being affected by the positional deviation in the axial direction. Targets 3a and 3a arranged on the circumference of the target plate 3 are hatched in FIG. 7.

In a similar manner, the rotational angle of the second shaft 2 and the target plate 4 on the basis of the output of the MR sensor 6 is calculated with a high accuracy without being affected by the positional deviation. Consequently, the rotational torque (steering torque) calculated by using a difference in the rotational angle of the target plates 3 and 4 also becomes highly accurate without being affected by the positional deviation. Consequently, in the rotational angle detection device and torque detection device according to the present invention, an accurate positioning between the target plate 3 and 4 as rotating members and MR sensors 5 and 6 as detecting means is not required at the time of assembling, thereby labor and time at the time of assembling can be alleviated.

Furthermore, in the above First Embodiment, the target plates 3 and 4 as rotating members are composed of gears having teeth as targets 3a, 3a . . . and targets 4a, 4a, . . . made of a magnetic member parallelly provided on an outer circumference thereof. However, the target plates 3 and 4 may be provided with targets as magnetically discontinuous members parallelly provided in a circumferential direction on the rotational circumference. An appropriate construction can be adopted except for the gears.

Other Embodiments

Figure 8:
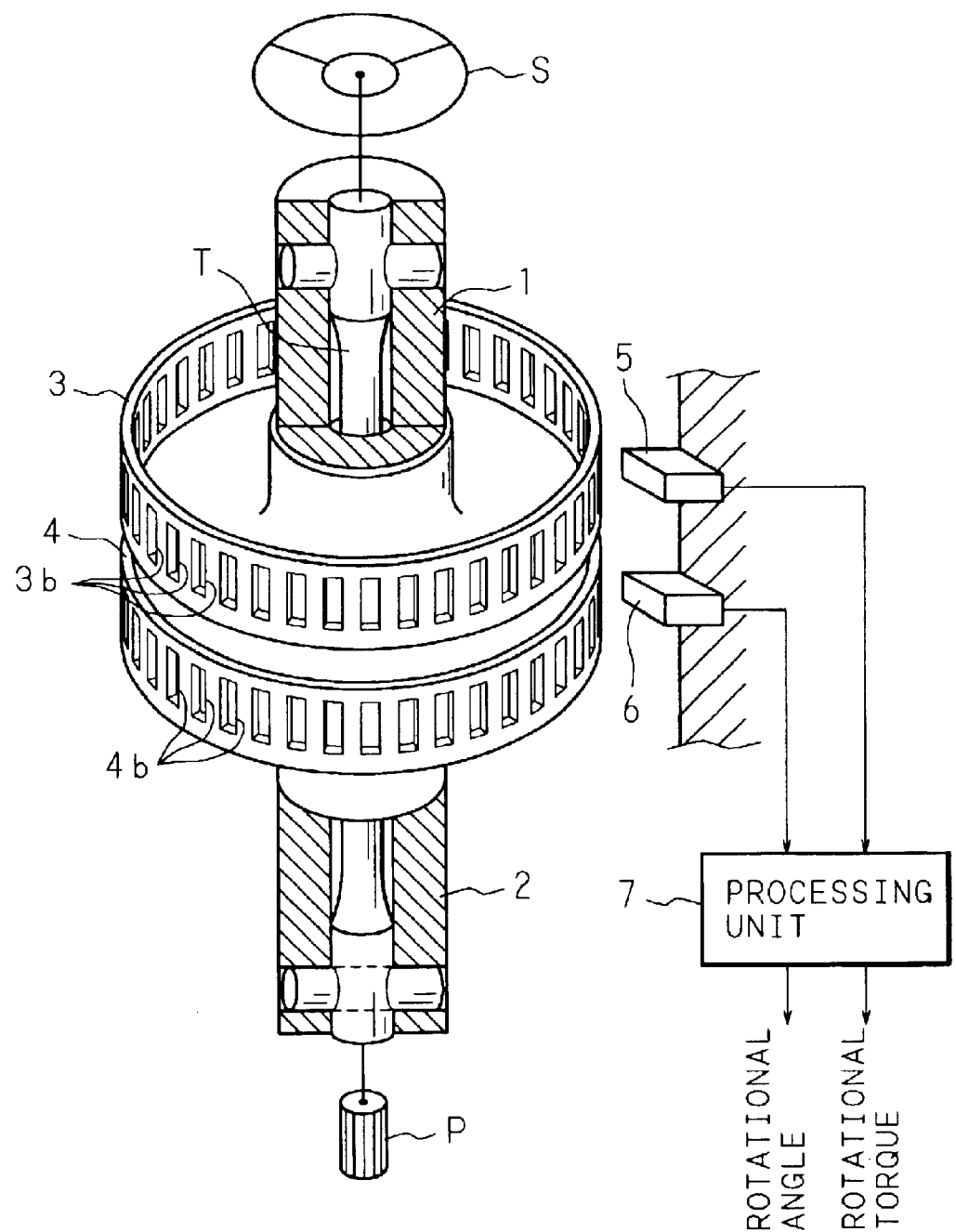
FIG. 8 is a schematic view showing a Second Embodiment of a rotational angle and torque detecting device according to the present invention.
Figure 9:
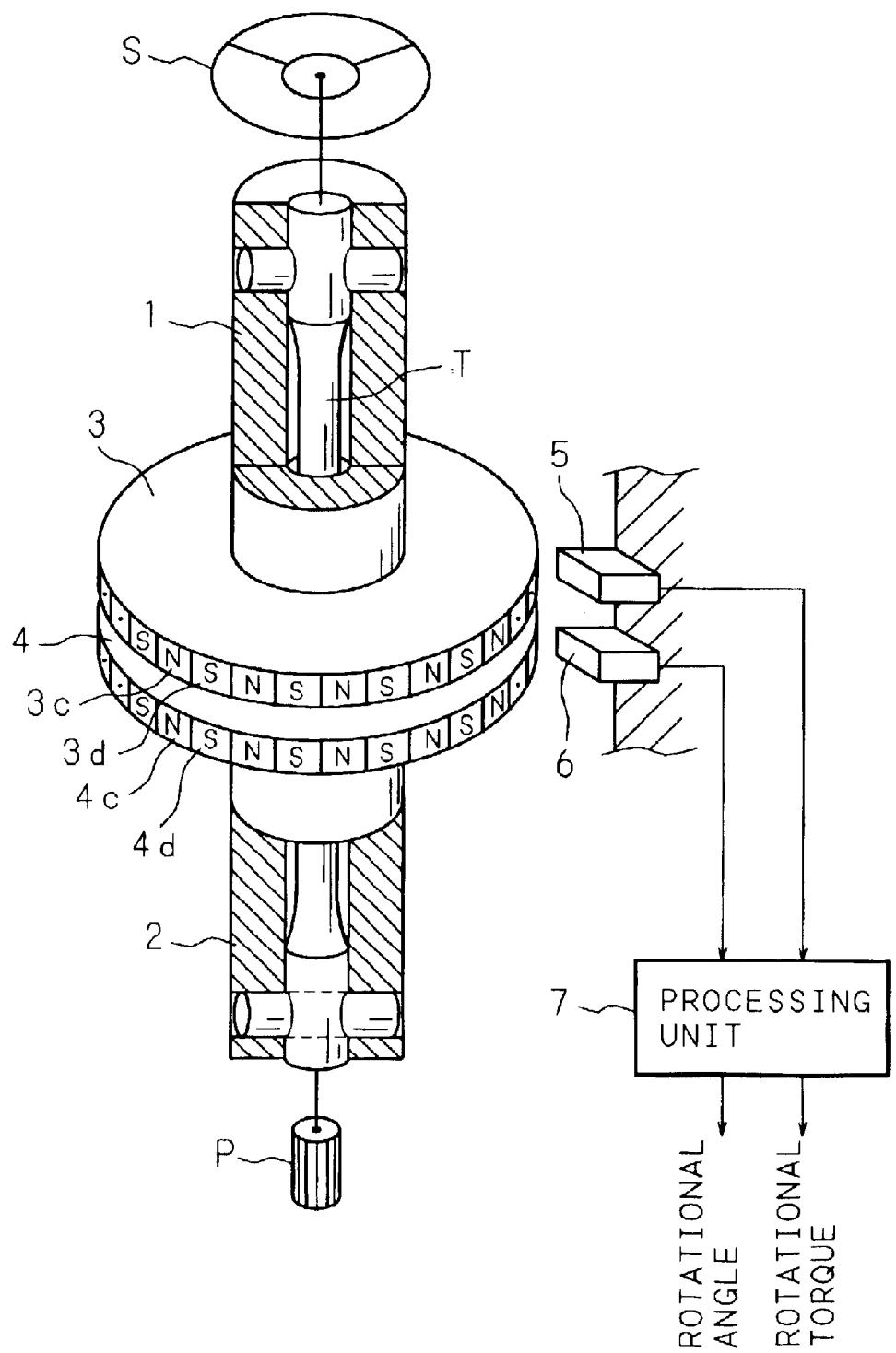
FIG. 9 is a schematic view showing a Third Embodiment of a rotational angle and torque detecting device according to the present invention.

FIG. 8 and FIG. 9 are schematic views showing Second and Third Embodiments of the rotational angle and torque detecting device according to the present invention.

In FIG. 8, rings, which are made of a magnetic member, coaxially fit and fixed to the first shaft 1 and the second shaft 2, and provided with, as targets, a plurality of slits 3b and 3b and 4b and 4b arranged at even intervals on an outer circumference thereof, are used as target plates 3 and 4. Furthermore, in FIG. 9, a magnetized disk, which are coaxially fit onto and fixed to the first shaft 1 and the second shaft 2, and provided with, as targets, magnetic poles 3c and 3d, and 4c and 4d having different polarities arranged alternately at even intervals on the outer circumferential surface thereof, are used as target plates 3 and 4. As in these embodiments, the construction of other parts than the target plates 3 and 4 is the same as the First Embodiment shown in FIG. 4, common constituent members are denoted by the same reference numerals and a detailed explanation thereof is omitted.

In the Second Embodiment shown in FIG. 8, the MR sensor 5 arranged opposite to the outer circumference of the target plate 3 generates an output which changes cyclically in respect to the magnetic material portion formed between the slits 3b and 3b adjacent to each other in accordance with a deviation in the circumferential direction of the slits 3b and 3b with the rotation of the target plate 3. Consequently, at the processing unit 7 to which this output is given, the rotational angle of the target plate 3 and the first shaft 1 is calculated.

Furthermore, in the Third Embodiment shown in FIG. 9, the MR sensor 5 arranged opposite to the outer circumference of the target plate 3 generates an output which changes cyclically with an action of the magnetic field formed between the magnetic poles 3c and 3d positioned adjacent to each other in accordance with a deviation in a circumferential direction of magnetic poles 3c and 3d arranged on the outer circumference of the target plate 3. Consequently, at the processing unit 7 to which this output is given, the rotational angle of the target plate 3 and the first shaft 1 is calculated. In this Embodiment, the internal magnet 5c for bias of the MR sensor becomes unnecessary.

In the same manner as the First Embodiment, the rotational angle of the target plate 4 and the second shaft 2 can be calculated by use of the output of the MR sensor 6 arranged opposite to the outer circumference of the target plate 4. Furthermore, the rotational torque (steering torque) applied to both shafts 1 and 2 can be calculated with a difference in the rotational angle of the first shaft 1 and the second shaft 2 which is respectively calculated.

In these Embodiments as well, the calculation result of the rotational angle and the rotational torque are not affected by the positional deviation in the axial direction between the target plates 3 and 4 as rotating members and the MR sensors 5 and 6 as detecting means. Substantially, in FIG. 8, a positional deviation within the scope in the axial direction of the width of the slits 3b, 3b . . . can be allowed while in FIG. 9, a positional deviation within the scope of the width of target plates 3 and 4 can be allowed as well.

As described in detail, in the rotational angle detecting device according to a first aspect of the present invention, the device is constructed in such a manner that a magnetically discontinuous portion is arranged in parallel in a circumferential direction on the rotational circumference of the rotating member as a target, and a deviation in the circumferential direction of these targets with the rotation of the rotating member is taken out as an output between a pair of detection elements arranged in a circumferential direction so as to correspond to a parallel arrangement interval of the target. Consequently, the influence of the positional deviation in the axial direction between the rotating member and the detecting means on the rotational angle which is calculated by using this output change does not arise, resulting in that a highly accurate detection of the rotational angle is enabled without requiring labor and time of positioning at the time of assembling.

Furthermore, in the rotational angle detecting device according to the second aspect of the present invention, a magnetic resistance effect element for changing electric resistance by action of the magnetic field is used as a pair of detection elements positioned opposite to the target provided on the rotating member, so that the rotational angle of the rotating member can be easily obtained on the basis of the output voltage of a bridge circuit including both elements.

Furthermore, in the rotational angle detecting device according to the third through fifth aspects of the present invention, a rotating member is composed of gears being provided with a plurality of teeth made of magnetic members arranged at even intervals on an outer circumferential surface, a ring made of a magnetic member being provided with a plurality of slits arranged at even intervals on the outer circumferential surface as a target, or a disk being provided with a magnetic pole having a different polarity arranged at even intervals on the outer circumferential surface and alternately arranged as a target, resulting in that a rotating member provided with a predetermined target can be easily manufactured.

Furthermore, in the torque detecting device according to a sixth aspect of the present invention, a rotational angle detecting device according to the first through fifth aspects of the present invention is provided which can detect an accurate rotational angle without being affected by a positional deviation in an axial direction between the rotating member and the detecting means respectively on the first shaft and the second shaft coaxially connected via a torsion element, thereby the rotational torque which is applied to the first shaft and second shaft can be detected with a high accuracy on the basis of the difference in the rotational angle detected by these rotational angle detecting devices.

Furthermore, in the steering apparatus according to the seventh aspect of the present invention, either or both of the rotational angle detecting device and the torque detecting device described above are provided on the steering shaft which connects the steering wheel and the steering mechanism as a detection target, so that either or both of the steering angle and the steering torque can be detected with a high accuracy, and the devices can be conveniently used for various types of control required for a high reliability, such as the drive control of an electric motor for steering assistance in the electric power steering apparatus.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A rotational angle detecting device comprising:

a rotating member;

a target provided on a rotational circumference of said rotating member; and detecting means for cyclically changing an output in accordance with a displacement of said target with the rotation of said rotating member, whereby a rotational angle of said rotating member is detected on the basis of the output change of said detecting means, wherein said target is a magnetically discontinuous portion, which is provided in a circumferential direction of said rotating member, wherein said detecting means is constructed in such a manner that a pair of detection elements, which sense magnetism, are arranged in a circumferential direction in accordance with an arrangement interval of said target to provide an output from said pair of detection elements, and wherein said rotating member is a ring made of a magnetic member being provided with a plurality of slits equally arranged on the outer circumferential surface as said target.

2. A rotational angle detecting device comprising:

a rotating member;

a target provided on a rotational circumference of said rotating member; and detecting means for cyclically changing an output in accordance with a displacement of said target with the rotation of said rotating member, whereby a rotational angle of said rotating member is detected on the basis of the output change of said detecting means, wherein said target is a magnetically discontinuous portion, which is provided in a circumferential direction of said rotating member, wherein said detecting means is constructed in such a manner that a pair of detection elements, which sense magnetism, are arranged in a circumferential direction in accordance with an arrangement interval of said target to provide an output from said pair of detection elements, wherein said pair of detection elements are magnetic resistance effect elements which change electric resistances with action of the magnetic field, and wherein said rotating member is a ring made of a magnetic member being provided with a plurality of slits equally arranged on the outer circumferential surface as said target.

3. A torque detecting device for detecting a rotational torque applied to a first shaft and a second shaft coaxially connected via a torsion element by a relative angle displacement between said first shaft and said second shaft caused by a torsion of said torsion element, comprising:

a first and second rotational angle detecting device provided on said first shaft and said second shaft, respectively; and torque calculating means for calculating the rotational torque on the basis of a rotational angle difference determined from an output of said first and second rotational angle detecting devices, wherein each of said first and second rotational angle detecting devices comprises:
a rotating member;
a target provided on a rotational circumference of said rotating member; and
detecting means for cyclically changing an output in accordance with a displacement of said targets with the rotation of said rotating member, whereby a rotational angle of said rotating member is detected on the basis of the output change of said detecting means,
wherein said target comprises magnetically discontinuous portions that are provided in a circumferential direction of said rotating member, and
wherein said detecting means is constructed in such a manner that a pair of detection elements, which sense magnetism, are arranged adjacent to said magnetically discontinuous portions, which are provided in the circumferential direction, in accordance with an arrangement interval of said target in order to provide an output from said pair of detection elements,
wherein said pair of detection elements are magnetic resistance effect elements which change electric resistances with action of the magnetic field, and
wherein said rotating member is a ring made of a magnetic member being provided with a plurality of slits equally arranged on the outer circumferential surface as said target.

4. A steering apparatus, comprising: said torque detecting device according to claim 3, said torque detecting device being provided at a steering shaft, which connects a steering wheel and a steering mechanism.

5. A rotational angle detecting device comprising:
a rotating member for rotating about a rotational axis;
a plurality of targets provided on the rotating member, the targets being magnetically discontinuous and are provided parallel to one another on a circumferential edge of the rotating member and are provided parallel to the rotational axis; and
a detector for detecting a rotational angle change of the rotating member on the basis of an output provided by a pair of magnetism sensing detection elements that are provided adjacent to the targets and that detect a magnetic field change of the magnetically discontinuous targets.

6. The rotational angle detecting device according to claim 5, wherein a spacing between the pair of magnetism sensing detection elements is based on a spacing between the magnetically discontinuous targets.

7. The rotational angle detecting device according to claim 6, wherein the spacing between the pair of magnetism sensing detection elements is determined from a midpoint of each magnetism sensing detection element and the spacing between the magnetically discontinuous targets is determined from a midpoint of each magnetically discontinuous target to a midpoint of an adjacent magnetically discontinuous target.

8. A torque detecting device for detecting a rotational torque applied to a first shaft and a second shaft coaxially connected via a torsion element by a relative angle displacement between said first shaft and second shaft caused by a torsion of said torsion element, comprising:

a first and second rotational angle detecting device provided on said first shaft and said second shaft, respectively; and
torque calculating means for calculating the rotational torque on the basis of a rotational angle difference determined from an output of said first and second rotational angle detecting devices,
wherein each of said first and second rotational angle detecting devices comprises:
a rotating member rotating about an axis;
a target provided on a rotational circumference of said rotating member; and
detecting means for cyclically changing an output in accordance with a displacement of said targets with the rotation of said rotating member; whereby a rotational angle of said rotating member is detected on the basis of the output change of said detecting means,
wherein said target comprises magnetically discontinuous portions that are provided parallel to one another in a circumferential direction of said rotating member and that are provided parallel to the axis, and
wherein said detecting means is constructed in such a manner that a pair of detection elements, which sense magnetism, are arranged adjacent to said magnetically discontinuous portions, which are provided in the circumferential direction, in accordance with an arrangement interval of said target in order to provide an output from said pair of detection elements.

9. A steering apparatus, comprising: said torque 3, detecting device according to claim 8, said torque detecting device being provided at a steering shaft, which connects a steering wheel and a steering mechanism.

10. The torque detecting device as set forth in claim 8, wherein said pair of detection elements are magnetic resistance effect elements which change electric resistances with action of the magnetic field.

11. The torque detecting device as set forth in claim 10, wherein said rotating member is a gear provided with a plurality of teeth made of a magnetic member equally arranged on the outer circumferential surface as said target.

12. The torque detecting device as set forth in claim 10, wherein said rotating member is a disk being provided with magnetic poles having different polarities which are equally and alternately arranged on the outer circumferential surface as said target.

13. A rotational angle detecting device comprising:
a rotating member rotating about an axis;
a target provided on a rotational circumference of said rotating member; and
detecting means for cyclically changing an output in accordance with a displacement of said targets with the rotation of said rotating member; whereby a rotational angle of said rotating member is detected on the basis of the output change of said detecting means,
wherein said target comprises magnetically discontinuous portions that are provided parallel to one another in a circumferential direction of said rotating member and that are provided parallel to the axis, and
wherein said detecting means is constructed in such a manner that a pair of detection elements, which sense magnetism, are arranged adjacent to said magnetically discontinuous portions, which are provided in the circumferential direction, in accordance with an arrangement interval of said target in order to provide an output from said pair of detection elements.

14. The rotational angle detecting device as set forth in claim 13, wherein said rotating member is a gear provided with a plurality of teeth made of a magnetic member equally arranged on the outer circumferential surface as said target.

15. The rotational angle detecting device as set forth in claim 13, wherein said rotating member is a disk being provided with magnetic poles having different polarities which are equally and alternately arranged on the outer circumferential surface as said target.

16. A steering apparatus, comprising: said rotational angle detecting device according to claim 13, said rotational angle detecting device being provided at a steering shaft, which connects a steering wheel and a steering mechanism.

17. The rotational angle detecting device according to claim 13, wherein an arrangement interval of said detection elements is set so as to align with the arrangement interval of said target.

18. The rotational angle detecting device as set forth in claim 13, wherein said pair of detection elements are magnetic resistance effect elements which change electric resistances with action of the magnetic field.

19. The rotational angle detecting device as set forth in claim 18, wherein said rotating member is a gear provided with a plurality of teeth made of a magnetic member equally arranged on the outer circumferential surface as said target.

20. The rotational angle detecting device as set forth in claim 18, wherein said rotating member is a disk being provided with magnetic poles having different polarities which are equally and alternately arranged on the outer circumferential surface as said target.

* * * * *